United States Patent [19]

Smith, Jr.

[11] 4,219,702
[45] Aug. 26, 1980

[54] MALFUNCTION DETECTOR FOR A DICTATION SYSTEM

[76] Inventor: Jack E. Smith, Jr., Rte. 1, P.O. Box 494S, Thomaston, Ga. 30286

[21] Appl. No.: 927,752

[22] Filed: Jul. 25, 1978

Related U.S. Application Data

[63] Continuation of Ser. No. 781,358, Mar. 25, 1977, abandoned.

[51] Int. Cl.² ............................................. G11B 27/36
[52] U.S. Cl. .......................... 179/100.1 DR; 340/661; 340/675; 360/31; 179/100.1 VC; 179/100.1 R
[58] Field of Search .............. 179/100.1 R, 100.1 DR, 179/100.1 VC, 6 R; 360/31, 7; 340/661, 675

[56] References Cited

U.S. PATENT DOCUMENTS

| | | | |
|---|---|---|---|
| 2,774,056 | 12/1956 | Stafford | 360/31 |
| 2,870,430 | 1/1959 | Hancock | 360/31 |
| 3,051,795 | 8/1962 | Roberts | 179/100.1 DR |
| 3,439,354 | 4/1969 | Behr | 360/31 |
| 3,448,215 | 6/1969 | Engel | 179/1001.1 VC |
| 3,485,961 | 12/1969 | Lovick | 360/15 |
| 3,865,986 | 2/1975 | Darwood | 179/100.1 VC |
| 3,911,360 | 10/1975 | Kimzey | 340/661 |
| 3,935,390 | 1/1976 | Winterhalter | 179/100.1 VC |
| 4,011,586 | 3/1977 | Pastor | 360/31 |

*Primary Examiner*—Daryl W. Cook
*Assistant Examiner*—Alan Faber
*Attorney, Agent, or Firm*—Jones, Thomas & Askew

[57] ABSTRACT

A dictation system having means for providing a signal for indicating when dictation which the system has been made operative to record on a recording medium is not being recorded on the recording medium because of a malfunction of the system or the improper operation of the system. The system includes means for providing a signal when the audio input to the dictation system and the audio input of dictation recorded on the recording medium are not in a predetermined relationship and means for providing said signal when dictation which the system has been made operative to record on the recording medium is absent from the recording medium for a predetermined length of time.

2 Claims, 2 Drawing Figures

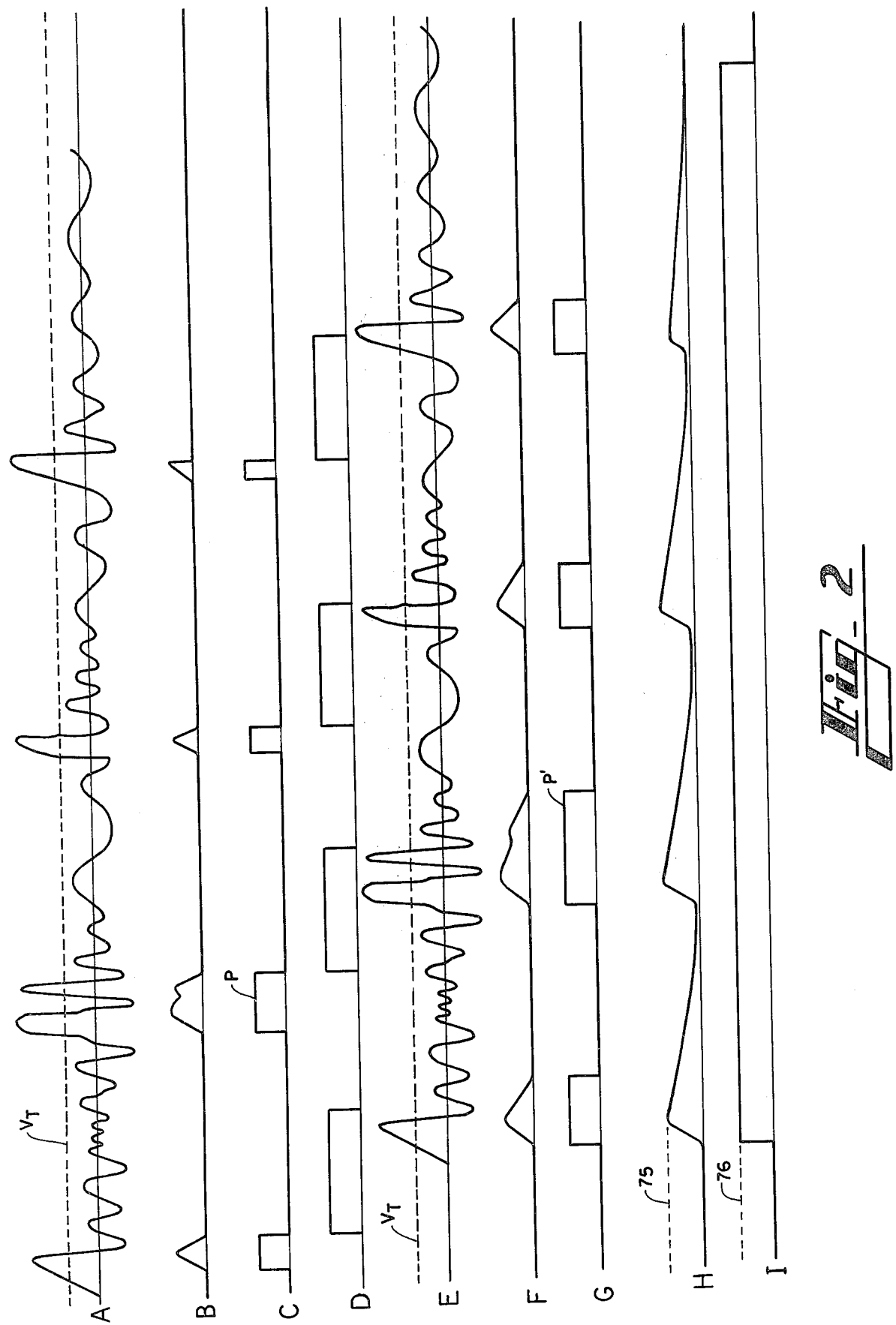

MALFUNCTION DETECTOR FOR A DICTATION SYSTEM

This is a continuation of application Ser. No. 781,358, filed Mar. 25, 1977, now abandoned.

BACKGROUND OF THE INVENTION

1. Field of the Invention

This invention relates to dictation systems and more particularly to a dictation system in which dictation is recorded on a recording medium as the recording medium moves relative to a recording head and in which the undetected failure of the recording medium to move relative to the recording head or failure of the recording head to be operative to record the dictation on the recording medium would render the dictation system inoperative for the recording of dictation.

2. Discussion of the Prior Art

In dictation systems in which dictation is recorded on a recording medium as the recording medium moves relative to a recording head, it is known in the prior art to provide a signal when the recording medium fails to move relative to the recording head while the dictation system is being operated in the recording mode of operation. The absence of recording medium movement relative to the recording head while the dictation system is in the recording mode of operation may be caused by either the recording medium becoming broken or by a mechanical or electrical malfunction of the device by which a recording medium is moved relative to the recording head. In any event, the signal provided informs the user of the dictation system that dictation which the user intends to be recorded in not being recorded.

A problem with many of these prior art dictation systems is that dictation which is intended to be recorded may not be recorded for reasons other than the failure of the recording medium to move relative to the recording head. For example, the microphone, the amplifier, or other elements in the circuit by which the recording head is powered may become inoperative to record dictation even though the recording medium is still moving relative to the recording head. On the other hand, this circuit may become only partially inoperative, but the quality of the dictation as recorded on the recording medium may be so poor as to make it difficult or substantially impossible for the dictation to be subsequently transcribed from the recording medium.

A similar problem is encountered when the user of a dictation system speaks too softly or places the microphone in a position which diminishes the quality of the audio input to the microphone. Moreover, even in the absence of this problem and even though there is motion of the recording medium relative to the recording head, the dictation which the user of the dictation-transcription system intends to record may be difficult or substantially impossible to transcribe if the rate of motion of the recording medium relative to the recording head varies erratically during the recording of the dictation because of the improper operation of the device which moves the recording medium relative to the recording head.

SUMMARY OF THE INVENTION

The invention disclosed herein overcomes these and other problems encountered with prior recording systems. This is because the invention provides a signal in response not only to a failure of the recording medium to move relative to the recording head but also in response to the failure of the microphone amplifier and other elements in the circuit by which the recording head is energized to operate properly, the failure of the user of the recording system to operate the recording system in such a manner as to provide an audio input to the recording system which is adequate for recording the dictation in a usable fashion on the recording medium, as well as the failure of the recording medium to move relative to the recording head at a substantially constant rate of motion.

These improvements in a recording system are provided by a recording system which includes means responsive to dictation in the audio circuit by which a recording head is energized to provide an audio input criterion of the quality of the dictation, means responsive to dictation recorded on a recording medium to provide a recording criterion of the quality of the dictation, and means responsive to the audio input criterion and the recording criterion for providing a signal indicative of the malfunction of the recording system when the audio input criterion and the recording criterion are not in a predetermined relationship.

In the embodiment of the invention disclosed herein, the audio input criterion is defined by a signal having an amplitude corresponding to the amplitude of the input of the recording head, but delayed by the length of time required for the recording medium to move from the recording head to a second location at a predetermined constant rate of motion. On the other hand, in the embodiment of the invention disclosed herein, the recording criterion is defined by the amplitude of dictation recorded on the recording medium when the recording medium arrives at the second location of dictation as a result of movement of the recording medium at the predetermined constant rate of motion. Thus, in the embodiment of the invention disclosed herein, the predetermined relationship is that the audio input criterion and the recording criterion occur at substantially the same time and that they each have an amplitude which equals or exceeds a predetermined value.

In the embodiment of the invention disclosed herein, the failure of the audio input criterion and the recording criterion to be in the defined relationship because they do not occur substantially simultaneously is indicative of a failure of the recording medium to be moved relative to the recording head at the predetermined constant rate. The absence of motion of the recording medium at the predetermined constant rate may be because the recording medium has broken, the device for moving the recording medium relative to the recording head has become inoperative, or some other reason. It may also be indicative of a variation in the rate of motion of the recording medium relative to the recording head which is so excessive as to so clearly distort the dictation recorded on the recording medium and render it difficult or substantially impossible to transcribe.

On the other hand, the failure of an audio input criterion and a recording criterion to be in a predetermined relationship because they each do not have an amplitude which is equal to or in excess of a predetermined amplitude is indicative of a failure of the recording head or the audio circuit by which the recording head is energized. Furthermore, it may also be indicative of a failure on the part of the user of the recording system to provide an audio input to the audio circuit of the recording system which is sufficient to energize the recording head at a level adequate for the recording of dictation.

In addition to providing a signal as described above, the embodiment of the invention described herein also includes means for providing a signal in response to the absence of dictation on a predetermined length of the recording medium even though the recording means has been placed in the recording mode of operation. When the signal is provided in response to this means, the signal is indicative of a failure of the audio circuit to energize the recording head.

These and other features and advantages of the invention will be more clearly understood upon consideration of the following specification and the accompanying drawing.

BRIEF DESCRIPTION OF THE DRAWING

FIG. 2, including A-I, is a pictorial representation of the waveforms of voltages at various points in the embodiment of the invention disclosed herein.

DESCRIPTION OF AN EMBODIMENT

Figure 1:
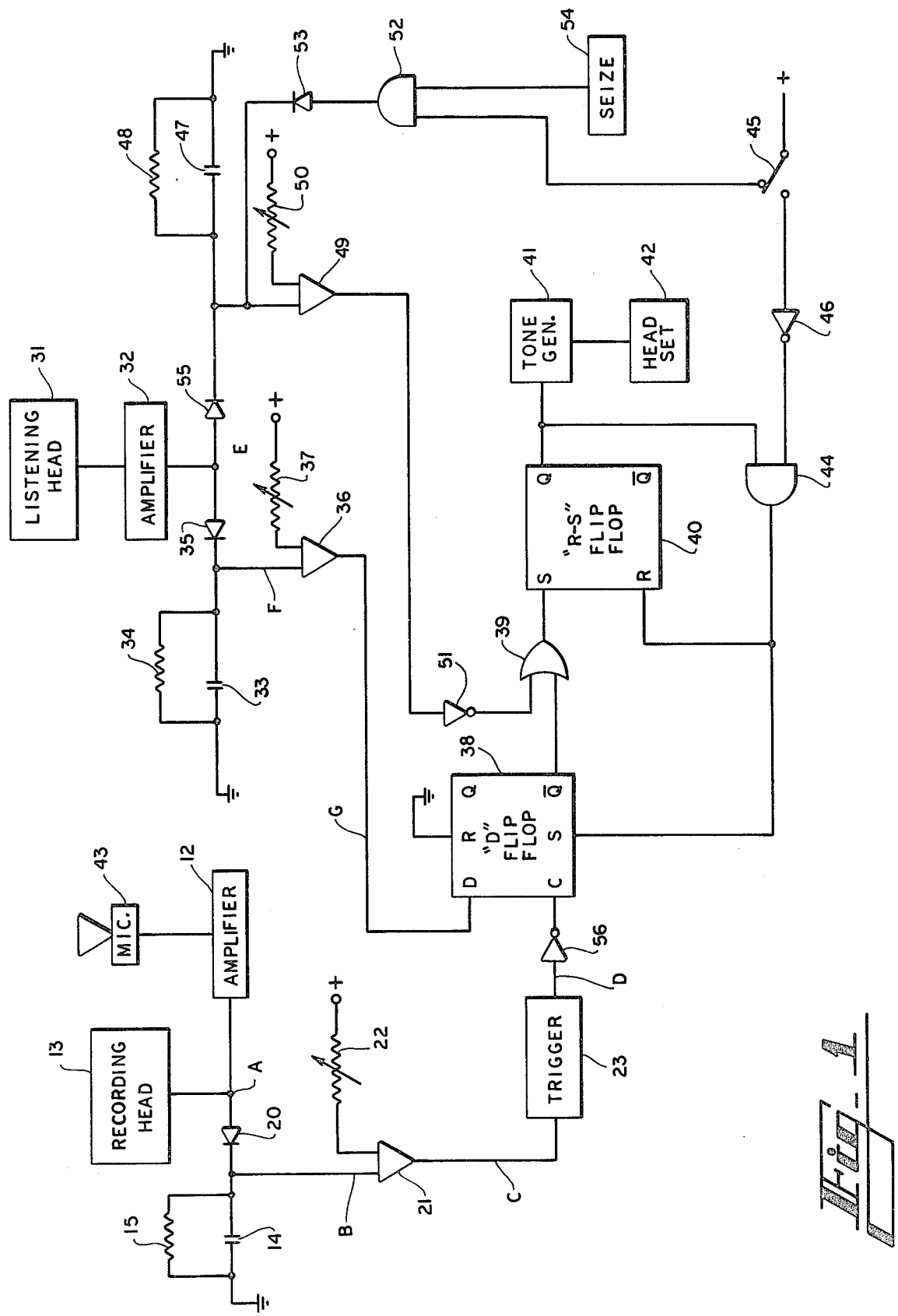
FIG. 1 is a schematic representation of the embodiment of the invention disclosed herein.

The invention disclosed herein is most easily understood from a consideration of FIG. 2 which shows the waveforms of various voltages at selected locations in the embodiment of the invention which is shown in more detail in FIG. 1. In FIG. 2, the waveform A represents the waveform of the voltage output from an audio amplifier 12 which energizes a recording head 13 for the recording of dictation on a recording medium (not shown). A threshold voltage at which the voltage present at the amplified audio input will cause an analog voltage comparator 21 to provide a logical one digital output is shown in FIG. 2 by the line VT.

The waveform B in FIG. 2 represents the voltage at the point B in excess of the threshold voltage VT in the circuit shown in FIG. 1. The voltage at the point B is the output from the RC circuit comprising the capacitor 14 and resistor 15 connected in parallel. The RC circuit filters the audio voltage at point A to provide the envelope of the waveform A, the waveform B, at point B. The value of the resistor 15 is chosen so that the RC circuit has a relatively high discharge rate. This is necessary to provide an input to the voltage comparator 21 at substantially the same time that the audio signals are being recorded on the recording medium by the recording head 13. A diode 20 is provided in the circuit to set a minimum voltage for the charging of the RC circuit and to prevent the RC circuit from discharging into the recording head 13 and the amplifier 12.

The voltage at B provides an input to the voltage comparator 21. It will be understood by those skilled in the art that a voltage comparator provides an output only in response to an input voltage in excess of the reference voltage set in the voltage comparator. The reference voltage at the voltage comparator 21 defines the threshold voltage VT and is set by the variable potentiometer 22 at a level such that the voltage comparator 21 will provide an output in response to electrical signals from the amplifier 12 which are caused by the presence of dictation to be recorded, but does not provide an output in response to noise.

The waveform C shown in FIG. 2 represents the voltage output from the voltage comparator 21. It will be seen that the step voltages in the waveform C occur at substantially the same time as the recording of waveform A as dictation at the recording head 13. Thus, the voltage steps in waveform C represent the periods of time during which dictation is provided by the audio amplifier 12 to the recording head 13 for recording.

The waveform D shown in FIG. 1 is the waveform provided by a signal generating means for providing a voltage pulse of predetermined amplitude and duration in response to a voltage having a particular amplitude in waveform C. In the specific embodiment of the invention shown in FIG. 2, the waveform D is at point D in FIG. 2 and is the output of a one shot negative edge triggered multivibrator 23. It will be understood by those skilled in the art that a one shot negative edge triggered multivibrator is a device capable of generating a pulse of a predetermined amplitude and duration in response to an abrupt drop in the voltage of the signal at its input. The trigger 23 provides an output in response to the drops in voltage output from the voltage comparator 21 which occur at substantially the same time that dictation ceases to be provided by the amplifier 12 for recording at the recording head 13. The abrupt drop in the input voltage of the trigger 23 indicates that the audio amplifier 12 is no longer being provided to the recording head 13. Thus, the pulse generated by the trigger 23 will be generated at the time that the recording of dictation on the recording medium stops.

As will be more fully described below, the recording medium is designed to move at a predetermined rate from the recording head 13 to a listening head 31 where the presence of the dictation recorded by the recording head 13 on the recording medium will be detected. As will also be further described below, the detection of the recorded dictation will occur only at the end of the period of the pulse generated by the trigger 23. The period of the pulse generated by the trigger 23 is equal to the period of time required for the end of the dictation recorded on the recording medium to move from the recording head 13 to the listening head 31.

The waveform E shown in FIG. 2 represents the voltage at the amplifier 32 which is provided in response to the playback of recorded dictation on the listening head 31. As will be seen, if the recording medium is moving at the desired predetermined rate, the waveform E will be identical to the waveform A of the dictation initially recorded on the recording medium. However, it will be delayed by the period of time ordinarily required for the recording medium to be moved from the recording head 13 to the listening head 31.

The waveform F represents the output from the RC circuit comprising the capacitor 33 and the resistor 34. A diode 35 prevents the RC circuit from being discharged back into the amplifier 32 or anywhere in the circuit other than the input to the voltage comparator 36. The discharge rate of the RC circuit is relatively high so that an input is provided to the voltage comparator 36 for a period closely approximating the period during which the signals from the amplifier 32 are in excess of the predetermined voltage at which dictation which indicates that dictation is present. However, the discharge rate of the RC circuit comprising capacitor 33 and resistor 34 is not as great as the discharge rate of the RC circuit comprising capacitor 14 and resistor 15. Thus, the period of the pulses in response to the playback of recorded audio in waveform F are longer than the pulses provided in response to the initial audio input shown in waveform B. As will be more fully described, this difference in pulse length enables the detection of the presence of an audio pulse in the waveform F even though the recorder audio passes the playback head 31 before or at substantially the same time that its presence is being detected.

The waveform G represents the voltage at the output of the voltage comparator 36 in response to the presence of dictation at the listening head 31. A reference voltage for the voltage comparator 36 is set at the variable potentiometer 37 which will cause the voltage comparator 36 to provide an output only in response to a high input voltage from the RC circuit indicating the presence of properly recorded dictation.

The voltage at the output of the voltage comparator 36, represented by the waveform G, provides a data input to the "D" flip-flop 38. It will be understood by those skilled in the art that a "D" flip-flop is a logic device which, when clocked, provides an output corresponding to the logic signal provided at the data input. In the preferred embodiment of the present invention, the presence of an output from the voltage comparator 36 provides a logical one data input to the "D" flip-flop 38. The absence of an output from the voltage comparator 36 provides a logical zero data input to the flip-flop 38.

The clock input to the D flip-flop 38 is the output of the inverter 56 which is the inverted output from the trigger 23. As has been described earlier, the end of the pulse from the trigger 23 is inverted by the inverter 39 to provide a clock input to the "D" flip-flop 56. If, upon clocking the "D" flip-flop 38, a logical one indicating the presence of dictation at the listening head 31 is provided at the data input to the "D" flip-flop 38, the "D" flip-flop 38 provides a Q output. Conversely, if a logical zero is provided at the data input indicating the absence of dictation at the listening head 31, then a —Q output is provided. As has been described above, if the recording medium has been moving at the desired predetermined rate between the recording head 13 to the listening head 31 the recording head 13 is recording the dictation properly and the operator of the dictation system is providing a sufficient audio input, then the presence of dictation at the listening head 31 should cause a logical one at the data input of the "D" flip-flop 38 when clocked at the end of the pulses generated by the trigger 23. Therefore, the presence of a logical zero at the data input indicates a malfunction in the recording medium drive mechanism (not shown) or a break in the recording medium, a malfunction of the recording head 13 or a failure on the part of the operator of the dictation system to provide a sufficient audio input.

In that case, the —Q output of the "D" flip-flop 38 provides a logical one input to OR gate 39 which in turn sets the flip-flop 40. The setting of the flip-flop 40 causes the flip-flop 40 to provide a Q output. The Q output of the flip-flop 40 provides an input signal to the tone generator 41 which produces an audible tone in the headset 42 indicating to the operator of the dictation system the existence of a malfunction in the operation of the dictation system.

It will now be understood that in a properly operating recording system embodying the invention disclosed herein, there is a pulse in the waveform C corresponding to a voltage of particular amplitude in the audio amplifier 12 and a pulse P' in the waveform G corresponding to the same particular voltage as it appears in the audio amplifier 32 responsive to a listening head 31. However, as will be more clearly understood from the following detailed description of a specific embodiment of the invention, the malfunction or improper operation of the recording head circuit 13, the failure of dictated material recorded on a recording medium (not shown) to pass from a recording head 13 to a listening head 31 because the recording medium, such as tape, has broken or the tape transport means has become inoperative will result in there being a pulse P but no corresponding pulse P'.

Similarly, should the tape transport means malfunction to deliver a recording medium such as tape from the recording head 13 to the tape transport at a constant rate of motion or at an erratic rate of motion which is such as to cause the dictation being recorded on the recording medium to be substantially distorted, the time of occurrence of a pulse P' relative to the time of occurrence of a pulse P will be changed.

Thus, it will now be understood that in accordance with the invention disclosed herein, the relationship of the pulses P to the pulses P' are indicative of the operation of a recording system and that the failure of a pulse P' to occur at a particular time relative to the occurrence of a corresponding pulse P is indicative of the malfunction of the recording system. It will also be apparent at this point that the absence of both pulses P and P' is also indicative of a malfunction of the recording system such as the failure of the audio amplifier 12 in the audio input circuit.

These features and advantages of the invention will be better understood from a consideration of FIG. 1 in which a conventional audio input circuit of a recording system is represented by a microphone 43 and a conventional audio output circuit is represented by the amplifier 12. It will be understood that the audio input circuit energizes a recording head 13 to record dictation on a recording medium such as tape (not shown) which in the audio input circuit has a waveform as represented by A in FIG. 2.

It will also be understood that the audio output circuit is responsive to a listening head 31 which is in turn responsive to dictation recorded on a recording medium to provide a voltage at E such as illustrated by waveform E of FIG. 2.

In the specific embodiment of the invention shown in FIG. 1, the voltage of waveform A at point A in FIG. 1 provides an input to a diode 20 which provides an output in response to the input of signals from the amplifier 12 in excess of the minimum voltage of the diode 20. The output from the diode 20 charges a capacitor 14 having a discharge rate determined by the value of the variable resistor 14. The voltage at point B is the envelope of that portion of the waveform at position A which is in excess of the threshold voltage of the diode 20.

As has been described above, the voltage at point B provides an input to the voltage comparator 21 which provides a logical one output only when the voltage at point B exceeds the threshold voltage VT which is set by the variable potentiometer 22. That portion of the voltage at point B which is in excess of the threshold voltage VT is shown as waveform B in FIG. 2. The output of the voltage comparator 21 provides a square waveform represented as waveform C in FIG. 2. As can be seen from FIG. 2, the pulses in waveform B are converted to the square wave pulses of waveform C by the voltage comparator 21.

As has also been described above, the negative edge of each square waveform in waveform C provides the starting point in time for the measurement of the period of time during which the recording medium carrying the recorded dictation should ordinarily move from the recording head 13 to the listening head 31. After the elapse of the predetermined period of time from the end of the square waveform, say P, the D flip-flop 38 is closed, causing it to detect the presence of the corresponding pulse P' generated by the passage of the recorded dictation past the listening head 31. If the pulse P' is detected at the data input of the "D" flip-flop 38, then the recording head 13 is properly recording the dictation and the recording medium is being moved past the recording head 13 and the listening head 31 at the proper rate. If the pulse P' is not present at the data input of the "D" flip-flop 38 then either the recording head 13 is not properly recording the dictation or the recording medium is not being moved past the recording head 13 and the listening head 31 at the proper rate.

The apparatus whereby the clock input is provided the "D" flip-flop 38 a predetermined period of time after the end of each square wave in the waveform C includes a negative edge triggered one shot multivibrator 23 and an inverter 56. The negative edge of each square wave causes the trigger 23 to provide an output for a predetermined period of time. The output from the trigger 23 is represented by the waveform D shown in FIG. 2. The inverter 56 inverts the output from the trigger 23 and provides an input to the D flip-flop 38. In this manner a logical one output from the inverter 56 provides a clock input to the "D" flip-flop 38 at the end of the predetermined period of each output from the trigger 23.

The apparatus whereby the data input is provided from the listening head 31 to the "D" flip-flop 38, represented by the waveform G shown in FIG. 2, will now be described. The listening head 31 provides an audio input to the amplifier 32. The output from the amplifier 32 is represented by waveform E shown in FIG. 2. The waveform E should be substantially similar to the waveform A, but delayed by the period of time required for the recording medium to travel the distance from the recording head 13 to the listening head 31. The output from the amplifier 32 provides an input to the diode 35. The diode 35 has a threshold voltage such that it only provides an output when the voltage of the waveform E is in excess of the threshold voltage.

The output from the diode 35 provides the input to an RC circuit which includes a capacitor 33 and a resistor 34. The discharge rate of the RC circuit is determined by the value of the resistor 34. As has been described above, the pulse P' must be present at the data input to the "D" flip-flop 38 when the "D" flip flop 38 is clocked at the end of the delay provided by the trigger 23. Since the delay is the period of time normally required for the recording medium to travel from the recording head 13 to the listening head 31, the length of the pulse P' in response to the playback of the recorded dictation must be longer than the length of the pulse P generated when the dictation was initially recorded. The length of the pulse P' is set by the selection of an RC circuit as an input to the comparator 36 which has a lower rate of discharge than the RC circuit which provides the input to the comparator 21. In this manner the output pulses of the comparator 36 will be longer than the output pulses of the comparator 21 and a pulse P' will continue to be present at the data input of the "D" flip-flop 38 even though the delay period before clocking the "D" flip-flop 38 is not started until the end of the P pulse.

The output from the RC circuit described above provides the input to the voltage comparator 36. When the input from the RC circuit exceeds the reference voltage set into the comparator 36 by the variable potentiometer 37, then the comparator 36 provides a logical one output to the data input of the "D" flip-flop 38. Here again the reference voltage is set sufficiently high that only properly recorded dictation will provide an input voltage high enough to cause an output voltage from the voltage comparator 36.

It will now be understood by those skilled in the art that the apparatus described above will provide a pulse P in response to the input of audio signals from the amplifier 12 and a pulse P' in response to the playback of properly recorded signals at the listening head 31 after a delay sufficient to permit the recording medium to travel from the recording head 13 to the listening head 31. Moreover, an apparatus is described for determining whether the recorded signals arrive at the listening head 31 after the period of time ordinarily required for the recording medium to travel from the recording head 13 to the listening head 31. In this manner a malfunction of the dictation system which causes it not to record the dictation on the recording medium may be detected. Similarly a malfunction in the means for moving the recording medium past the recording head 13 and the listening head 31 may be detected when the recording medium is not being moved at the proper rate. As has been described above, the detection of one of the aforesaid conditions by the "D" flip-flop 38 causes the "D" flip-flop 38 to provide a −Q output to the OR gate 39. The OR gate 39 provides an output which sets the flip-flop 40 providing a Q output to the tone generator 41 in order to provide an output to the headset 42.

The Q output from the flip-flop 40 also provides an output to an AND gate 44. It will be known to those skilled in the art that a dictate station from which dictation is recorded normally includes a switch 45 which provides a record control input to the dictation recorder. When the switch 45 is opened by the operator to stop the recording of dctation, the logical one input to the inverter 46 terminates. The inverter 46 in turn provides a logical one input to the AND gate 44. The output from the AND gate 44 resets the "D" flip-flop 38 to eliminate the −Q output from "D" flip-flop 38 to the OR gate 39. The output from the AND gate 44 also resets the flip-flop 40 eliminating the output to the tone generator 41 and the tone at the headset 42. It will now be understood by those skilled in the art that opening or releasing the dictate control switch 45 resets the preferred embodiment described above so that dictation may be resumed after the malfunction is corrected. Of course, if the malfunction is not corrected before further dictation is attempted then the apparatus will respond accordingly and once again provide a tone at the head set 42.

The preferred embodiment also includes an apparatus for detecting the absence of recorded dictation for a predetermined period of time despite the fact that the dictation recorder has been placed in a condition to record dictation. This function is particularly important when the operator of the dictation recorder has dictated continuously for a relatively long period thereby preventing the "D" flip-flop 38 from being clocked by a pause in dictation. In that case the apparatus to be described below will provide the warning signal indicating that the dictation is not being properly recorded if the dictation has not been recorded for a predetermined period of time.

As has been described above, the amplified output from the listening head 31 provides a voltage at point E in the circuit shown in FIG. 1.

As shown in FIG. 2, the waveform E at point E also charges a capacitor 47 which discharges through a resistor 48. The discharge rate of the capacitor 48 is selected such that the voltage at the point H is substantially the waveform H in FIG. 1. This voltage at the point H in FIG. 1 provides an input to the voltage comparator 49. The reference voltage for the voltage comparator 49 is set by the variable potentiometer 50 to be above some predetermined voltage such as the voltage 7 in FIG. 2. Accordingly, it will be understood that the voltage peaks in the waveform E are serving to provide a substantially continuous voltage output from the voltage comparator 49, shown as waveform I in FIG. 2. However, it will also be understood that upon the failure of a voltage peak to occur in the waveform H for a substantial period of time, the voltage comparator 49 provides no voltage output. The output of the voltage comparator 49 is inverted by the inverter 51 to provide an input through the OR gate 39 to the flip-flop 40. As with the previously-described input to the set terminal of the flip-flop 40, this input to the flip-flop 40 causes the tone generator 41 to provide a tone in the headset 42 which may be terminated by releasing the dictate switch 45.

In order to prevent the tone from starting immediately when the dictate switch 45 is first operated before the capacitor 47 can be charged by the passage of recorded dictation on the recording medium past the listening head 31, a voltage, represented by the dashed line 75 in waveform H, is provided by the seizure of the recorder dictate switch 45 through an AND gate 52 and diode 53 to the point H to provide an initial charge to the capacitor 47. The closing of the dictate switch 45 removes the input from the AND gate 52 and the capacitor 47 is allowed to discharge until subsequently charged by the playback of dictation past the listening head 31. Thus, the flip-flop 40 will not be set by a the absence of an output from the voltage comparator 49, as is shown by the dashed line 76 in waveform I, unless the listening head 31 does not encounter dictation recorded on the recording medium within the predetermined length of time set by the discharge rate of the capacitor 47. However, it should also be understood that the voltage output from the voltage comparator 49 serves to provide a tone when the user of the dictate system is maintaining the dictate system in a recording mode without actually attempting to record dictation on a recording medium. Thus, it also provides a warning tone whenever the recording system is inadvertently placed in a recording mode of operation without any intent to record dictation.

It will now be understood by those skilled in the art that the preferred embodiment described above fulfills all of the objects of the present invention. However, the preferred embodiment has been described solely for illustrative purposes and the scope of the present invention is limited soley by the appended claims.

What is claimed is:

1. In a recording system having a recording means for recording voice generated signals within a first audio circuit on a recording medium as recorded signals while said recording medium moves relative to said recording means and along a path extending from said recording means to a second location:
   first condition means for establishing a first condition within said recording system in response to a magnitude characteristic of said voice generated signals within said first audio circuit;
   signal generating means for generating audio frequency signals within a second audio circuit in response to said recorded signals on said recording medium at said second location;
   second condition means for providing a second condition within said recording system in response to a magnitude characteristic of a sample of said audio frequency signals within said second audio circuit, said sample of said audio frequency signals being selected a pre-determined length of time after the establishing of said first condition by said first condition means;
   third condition means for providing a third condition in response to the absence of said audio frequency signals within said second audio circuit for a predetermined length of time while said recording medium moves relative to said recording means; and
   warning means for providing a warning signal to a user of said recording system in response to said third condition or alternately in response to said first condition and the absence of said second condition.

2. A dictation system including a dictation recorder comprising a record head responsive to input electrical signals for providing recorded dictation on a recording medium when said dictation recorder is in a recording mode of operation, wherein the improvement comprises:
   a first detection means for providing a first output voltage proportional to the average value of said input electrical signals;
   a first comparator means for providing a first comparator output when said first output voltage exceeds a first predetermined reference voltage;
   a playback transducer for providing output electrical signals in response to said recorded dictation;
   a second detection means for providing a second output voltage proportional to the average value of said output electrical signals;
   a third detection means for providing a third output voltage, said third output voltage being alternately responsive to the average value of said output electrical signals when said recorder is in said recording mode of operation and to a predetermined preset voltage when said recorder is not in said recording mode of operation;
   a second comparator means for comparing said second output voltage to a second predetermined reference voltage a predetermined interval of time after each termination of said first comparator output and for providing a second comparator output when said second output voltage exceeds said second predetermined reference voltage;
   a third comparator means for comparing said third output voltage and a third predetermined reference voltage and for providing a third comparator output when said third output voltage exceeds said third predetermined reference voltage; and
   warning means for providing a warning signal in response to either the absence of said second comparator output or the absence of said third comparator output.

* * * * *